US007003534B2

(12) United States Patent
Peng

(10) Patent No.: US 7,003,534 B2
(45) Date of Patent: Feb. 21, 2006

(54) GENERATING DIFFERENCE FILES USING MODULE INFORMATION OF EMBEDDED SOFTWARE COMPONENTS

(75) Inventor: Luosheng Peng, Alviso, CA (US)

(73) Assignee: InnoPath Software, Inc., Sunnyvale, CA (US)

( * ) Notice: Subject to any disclaimer, the term of this patent is extended or adjusted under 35 U.S.C. 154(b) by 362 days.

(21) Appl. No.: 10/298,393

(22) Filed: Nov. 18, 2002

(65) Prior Publication Data

US 2004/0098420 A1    May 20, 2004

(51) Int. Cl.
G06F 17/30    (2006.01)
(52) U.S. Cl. ...................................... 707/203; 717/169
(58) Field of Classification Search ................ 707/101, 707/104.1, 200–204; 711/161, 162, 165; 717/122, 140, 163, 164, 168, 169, 170–172
See application file for complete search history.

(56) References Cited

U.S. PATENT DOCUMENTS

| 5,479,654 | A | 12/1995 | Squibb ........................ 707/201 |
| 5,574,906 | A | 11/1996 | Morris |
| 5,742,905 | A | 4/1998 | Pepe ........................... 455/461 |
| 5,806,078 | A * | 9/1998 | Hug et al. ................... 715/511 |
| 5,813,017 | A | 9/1998 | Morris |
| 5,832,520 | A | 11/1998 | Miller ........................ 707/203 |
| 6,018,747 | A | 1/2000 | Burns |
| 6,052,531 | A | 4/2000 | Waldin |
| 6,088,694 | A | 7/2000 | Burns ............................ 707/8 |
| 6,167,258 | A | 12/2000 | Schmidt ..................... 455/419 |
| 6,233,589 | B1 | 5/2001 | Balcha |
| 6,269,456 | B1 | 7/2001 | Hodges |
| 6,327,671 | B1 | 12/2001 | Menon .......................... 714/6 |
| 6,349,311 | B1 | 2/2002 | Sobel |
| 6,374,250 | B1 | 4/2002 | Ajtai .......................... 707/101 |
| 6,401,239 | B1 | 6/2002 | Miron |
| 6,442,660 | B1 * | 8/2002 | Henerlau et al. ........... 711/165 |
| 6,470,329 | B1 | 10/2002 | Livschitz |
| 6,526,574 | B1 | 2/2003 | Jones |
| 6,535,894 | B1 | 3/2003 | Schmidt |
| 6,542,906 | B1 | 4/2003 | Korn |
| 6,594,822 | B1 * | 7/2003 | Schweitz et al. ........... 717/140 |
| 6,615,404 | B1 | 9/2003 | Garfunkel |
| 6,651,190 | B1 | 11/2003 | Worley |

(Continued)

OTHER PUBLICATIONS

Tichy, Walter F., "The string-to-string correction problem with block moves", ACM Transaction on Computer Systems, vol. 2, No. 4, Nov. 1984, pp. 309-321.

(Continued)

*Primary Examiner*—Leslie Wong
(74) *Attorney, Agent, or Firm*—Courtney Staniford & Gregory LLP

(57) ABSTRACT

In generating difference information between different file versions, a software component distributor (SCD) receives new files and corresponding original files. The SCD generates a new map file, hex file, and device memory map (DMM) for the new file. Module information is read from the new file using information of the new map file and hex file. The SCD, using the module information, compares the new DMM with the DMM of the original file, identifying inserted and deleted modules of the new file in response to the comparison. The SCD identifies remaining modules of the new file in which the contents remain the same as corresponding modules of the original file, where the remaining modules are modules of the new file not identified as inserted modules. The SCD generates difference information representative of the inserted modules, deleted modules, and remaining modules in which the contents remain the same.

13 Claims, 7 Drawing Sheets

U.S. PATENT DOCUMENTS

| | | |
|---|---|---|
| 6,671,703 B1 | 12/2003 | Thompson |
| 6,671,757 B1 * | 12/2003 | Multer et al. ............... 710/100 |
| 6,694,336 B1 | 2/2004 | Multer ........................ 707/201 |
| 6,836,657 B1 | 12/2004 | Ji |
| 2001/0029178 A1 | 10/2001 | Criss |
| 2001/0049263 A1 | 12/2001 | Zhang |
| 2002/0099726 A1 | 7/2002 | Crudele ...................... 707/200 |
| 2002/0129107 A1 | 9/2002 | Loughran ................... 709/206 |
| 2003/0110253 A1 * | 6/2003 | Anuszczyk et al. ......... 709/224 |
| 2003/0200207 A1 | 10/2003 | Dickinson |
| 2003/0212712 A1 | 11/2003 | Gu .............................. 707/200 |
| 2004/0062130 A1 | 4/2004 | Chiang .................. 365/230.03 |
| 2004/0092255 A1 | 5/2004 | Ji ................................ 455/419 |
| 2004/0098361 A1 | 5/2004 | Peng ............................. 707/1 |
| 2004/0098413 A1 | 5/2004 | Peng ........................... 707/200 |
| 2004/0098421 A1 | 5/2004 | Peng ........................... 707/203 |
| 2004/0098427 A1 | 5/2004 | Peng ........................... 707/205 |
| 2004/0111427 A1 | 6/2004 | Gu .............................. 707/101 |
| 2004/0220980 A1 | 11/2004 | Forster |

OTHER PUBLICATIONS

Ajtai, Miklos et al., "Compactly encoding unstructured inputs with differential compression", IBM Almaden Research Center, 44 pages.

Burns, Randal C. et al., "In-place reconstruction of delta compressed files", IBM Almaden Research Center, 9 pages.

Burns, Randal et al., "In-place reconstruction of version differences", IBM Almaden Research Center, 25 pages.

Liv, Jacob et al., "A universal algorithm for sequential data compression", IEEE Transactions on Information Theory, vol. IT-23, No. 3, May 1977.

* cited by examiner

GENERATING DIFFERENCE FILES USING MODULE INFORMATION OF EMBEDDED SOFTWARE COMPONENTS

RELATED APPLICATIONS

This application is related to the application titled BYTE-LEVEL FILE DIFFERENCING AND UPDATING ALGORITHMS, application Ser. No. 10/146,545, filed May 13, 2002, the application titled UPDATING ELECTRONIC FILES USING BYTE-LEVEL FILE DIFFERENCING AND UPDATING ALGORITHMS, application Ser. No. 10/261,153, filed Sep. 30, 2002, the application titled UPGRADING OF ELECTRONIC FILES INCLUDING AUTOMATIC RECOVERY FROM FAILURES AND ERRORS OCCURRING DURING THE UPGRADE, application Ser. No. 10/292,245, U.S. Pat. No. 6,836,657, filed Nov. 12, 2002, the application titled DEVICE MEMORY MANAGEMENT DURING ELECTRONIC FILE UPDATING, application Ser. No. 10/298,458, filed Nov. 18, 2002, the application titled CONTROLLING UPDATES OF ELECTRONIC FILES, application Ser. No. 10/298,863, filed Nov. 18, 2002, the application titled SCHEDULING UPDATES OF ELECTRONIC FILES, application Ser. No. 10/298,862, filed Nov. 18, 2002, and the application titled MANAGING ELECTRONIC FILE UPDATES ON CLIENT DEVICES, application Ser. No. 10/298,896, filed Nov. 18, 2002, all of which are currently pending.

TECHNICAL FIELD

The disclosed embodiments relate to updating and maintaining electronic files.

BACKGROUND

Software running on a processor or central processing unit (CPU) to provide certain functionality often changes over time. The changes may result from the need to correct bugs, or errors, in the software files, adapt to evolving technologies, or add new features. In particular, embedded software components hosted on mobile wireless devices often include numerous software bugs that require correction.

Software includes one or more files in the form of human-readable American Standard Code for Information Interchange (ASCII) plain text files or binary code. Software files can be divided into smaller units that are often referred to as modules or components. A UNIX platform or personal computer (PC) includes multiple software components, and each of the software components is managed and updated independently through a file system supported by a corresponding operating system (OS). Information used to update software files or software components hosted on UNIX platforms or PCs can be transferred through the Internet or loaded from a secondary storage medium such as a floppy disk, a compact disk read-only memory (CD-ROM), or a compact flash card.

In contrast, in mobile wireless devices, a real-time operating system (RTOS) is typically used in which all software components are linked as a single large file. Further, no file system support is typically provided in these mobile wireless devices. In addition, the single large file needs to be preloaded, or embedded, into the device using a slow communication link like a radio, infrared, or serial link.

Obstacles to updating the large files of mobile wireless devices via slow communication links include the time, bandwidth, and cost associated with delivering the updated file to the device. Distribution of such large files can take an undesirably long time from the point of view of the customer and can consume large amounts of server resources from the point of view of the file provider. Delivering a large file over an unreliable communication link such as a radio link may also increase the rate of communication failure and require a large working memory within the device, for example random access memory (RAM).

One existing solution to the problem of delivering large files to mobile devices includes the use of compression. A number of existing compression algorithms are commonly used. These algorithms typically support compression of a file down to approximately 40% of its original size; often, however, even the compressed file is too large for download to a device via a slow, costly, narrowband communication link.

Another typical solution for updating files uses difference programs to generate a description of how a revised file differs from an original file. There are commonly available difference programs running on UNIX or PC platforms that produce such difference data. The size of the difference data file corresponding to a large binary file can be as small as 10% to 20% of the revised or original file size. However, as with compression, the difference file produced using these difference programs is often too large for transfer via the associated communication protocols. In addition, the difference programs known in the art are not efficient in that they require long computation times for generating the difference file and a large amount of working memory in the mobile communication device to effect the update of the original file.

Figure 1:
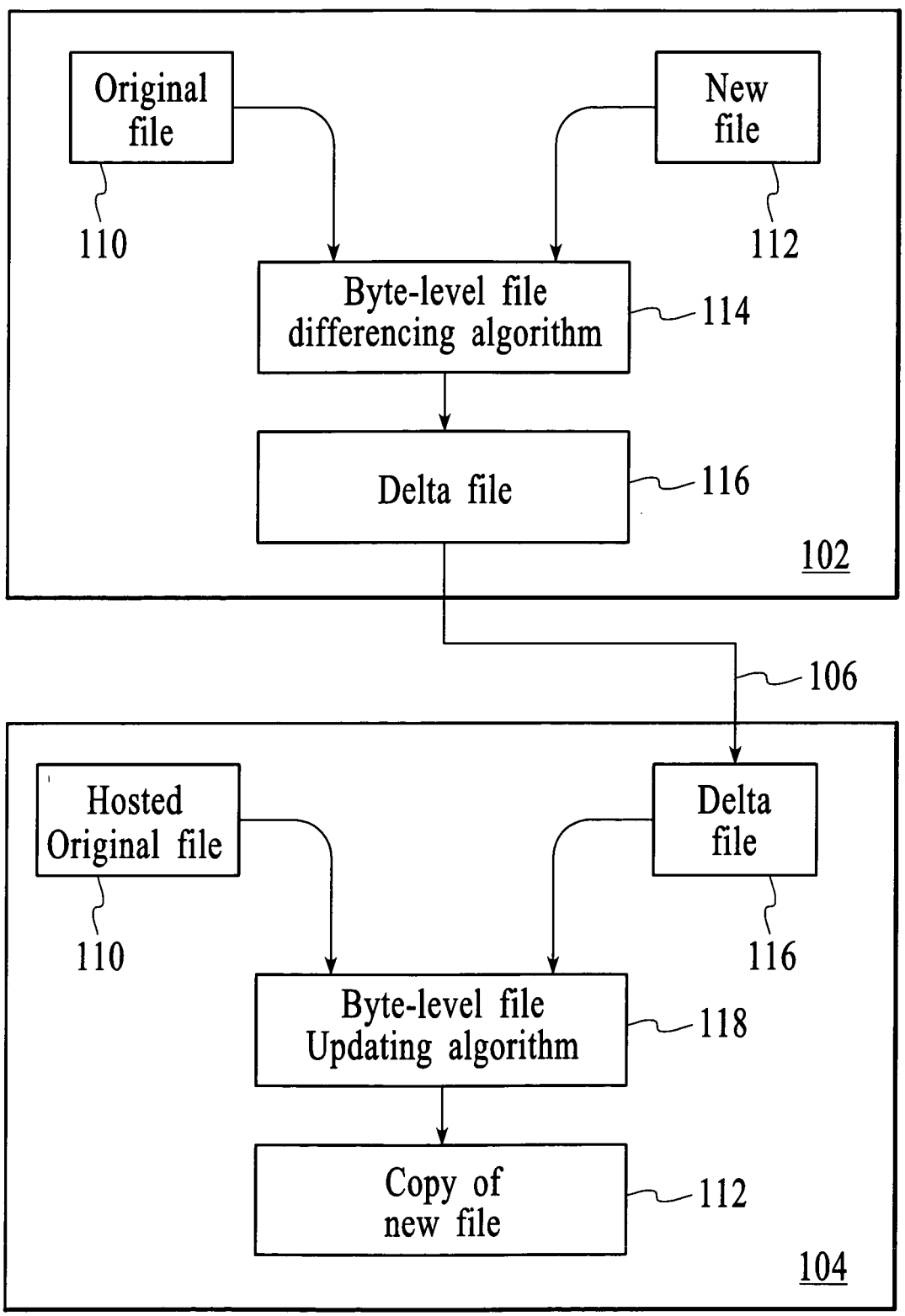
FIG. 1 is a block diagram showing a file differencing and updating system, under an embodiment.

In the drawings, the same reference numbers identify identical or substantially similar elements or acts. To easily identify the discussion of any particular element or act, the most significant digit or digits in a reference number refer to the Figure number in which that element is first introduced (e.g., element 102 is first introduced and discussed with respect to FIG. 1).

Unless described otherwise below, the construction and operation of the various blocks and structures shown in the Figures are of conventional design. As a result, such blocks need not be described in further detail herein, because they will be understood by those skilled in the relevant art. Such further detail is omitted for brevity and so as not to obscure the detailed description of the invention. Any modifications necessary to the Figures can be readily made by one skilled in the relevant art based on the detailed description provided herein.

DETAILED DESCRIPTION

In generating difference information between different file versions, a software component distributor (SCD) receives new files and corresponding original files. Each of the original and new files includes at least one module. Components of the SCD extract a new map file, hex file, binary file, and device memory map (DMM) associated with the new file. Module information is read from the new file using information of the new map file and new hex file. The SCD components use the module information to compare the new DMM with the DMM of the original file, identifying inserted and deleted modules of the new file in response to the comparison.

Furthermore, components of the SCD identify a first group of remaining modules in which size and contents remain the same as corresponding modules of the original file; the remaining modules are any modules of the new file not identified as inserted modules. The SCD components also identify a second group of remaining modules including modules having a different size and modules having a same size and different content than the corresponding modules of the original file. The SCD generates difference information representative of the inserted modules, deleted modules, and the first group of remaining modules. Additionally, the SCD generates a delta file including the difference information along with information of the edit distance between corresponding modules of the second group of remaining modules of the new file and the original file.

A system for updating electronic files using a byte-level file differencing and updating (FDU) algorithm, herein referred to as the FDU algorithm, is described in detail herein. FIG. 1 is a block diagram showing a file differencing and updating system including the FDU algorithm of an embodiment. The FDU algorithm includes a differencing component and an updating component. The differencing component, referred to herein as the file differencing algorithm and described in detail in the Related Applications, generates a difference file in a first computer system from an original version and a new version of an electronic file. The updating component, referred to herein as the file updating algorithm and described in detail in the Related Applications, generates a copy of the new file on a second computer system using the difference file and the hosted copy of the original file. In the following description, numerous specific details are introduced to provide a thorough understanding of, and enabling description for, embodiments of the invention. One skilled in the relevant art, however, will recognize that the invention can be practiced without one or more of the specific details, or with other components, systems, etc. In other instances, well-known structures or operations are not shown, or are not described in detail, to avoid obscuring aspects of the invention.

With reference to FIG. 1, a first computer system 102 and a second computer system 104 communicate via a communication path 106. These computer systems 102 and 104 include any collection of computing devices operating together, as is known in the art. The computer systems 102 and 104 also include components within a larger computer system. The communication path 106 includes any medium for communicating or transferring files among the computer systems 102 and 104. Therefore, this path 106 includes wireless connections, wired connections, and hybrid wireless/wired connections. The communication path 106 also includes couplings or connections to networks including local area networks (LANs), metropolitan area networks (MANs), wide area networks (WANs), proprietary networks, interoffice or backend networks, and the Internet. Furthermore, the communication path 106 includes removable fixed mediums like floppy disks, hard disk drives, and CD-ROM disks, as well as flash RAM, Universal Serial Bus (USB) connections, RS-232 connections, telephone lines, buses, and electronic mail messages.

The first communication system 102 receives an original version 110 and a new version 112 of an electronic file. The original version 110 of the electronic file is referred to herein as the original file 110. The new version 112 of the electronic file is referred to herein as the new file 112. The new file 112 is generally an updated or revised version of the original file 110, but is not so limited. The electronic files 110 and 112 include software files including dynamic link library files, shared object files, embedded software components (EBSCs), firmware files, executable files, data files including hex data files, system configuration files, and files including personal use data, but are not so limited. Since any type of file can be regarded as a byte stream, hereafter a file can be described as a byte stream.

The file differencing algorithm 114 receives the new file 112, compares it to the original file 110, and calculates the byte-level differences between the compared files, as described in the Related Applications. The file differencing algorithm 114 may also preprocess the original 110 and the new 112 files to reduce the sizes of the files 110 and 112 prior to the calculation of the file differences. The file differencing algorithm 114 generates a difference file 116, referred to herein as a delta file, during the comparison.

Contents of the delta file 116 provide an efficient representation of the byte-level differences between the new and the original files. The delta file 116 includes meta-data along with actual data of replacement and/or insertion operations that represent the differences between the new or current version of the associated file and previous versions of the file. The file differencing algorithm 114 provides any differences between the original 110 and the new 112 files in the delta file 116 using a minimum number of bytes and a pre-defined format or protocol, thereby providing a delta file optimized in space.

The delta file 116 is transferred or transmitted to another computer system 104 via the communication path 106. Prior to transfer, the delta file 116 may be compressed using any of a number of compression techniques known in the art, but is not so limited. The file updating algorithm 118 hosted on the receiving computer system 104 uses the delta file 116 along with the hosted original file 110 to generate or create a copy of the new file 112. This copy of the new file 112 is then used to update the original file 110 hosted on the client device 104 that is targeted for revision or updating. Upon completion of this update process, the new file 110 now stored on the second computer system 104 is identical to the new file 110 received in the first computer system.

Figure 2:
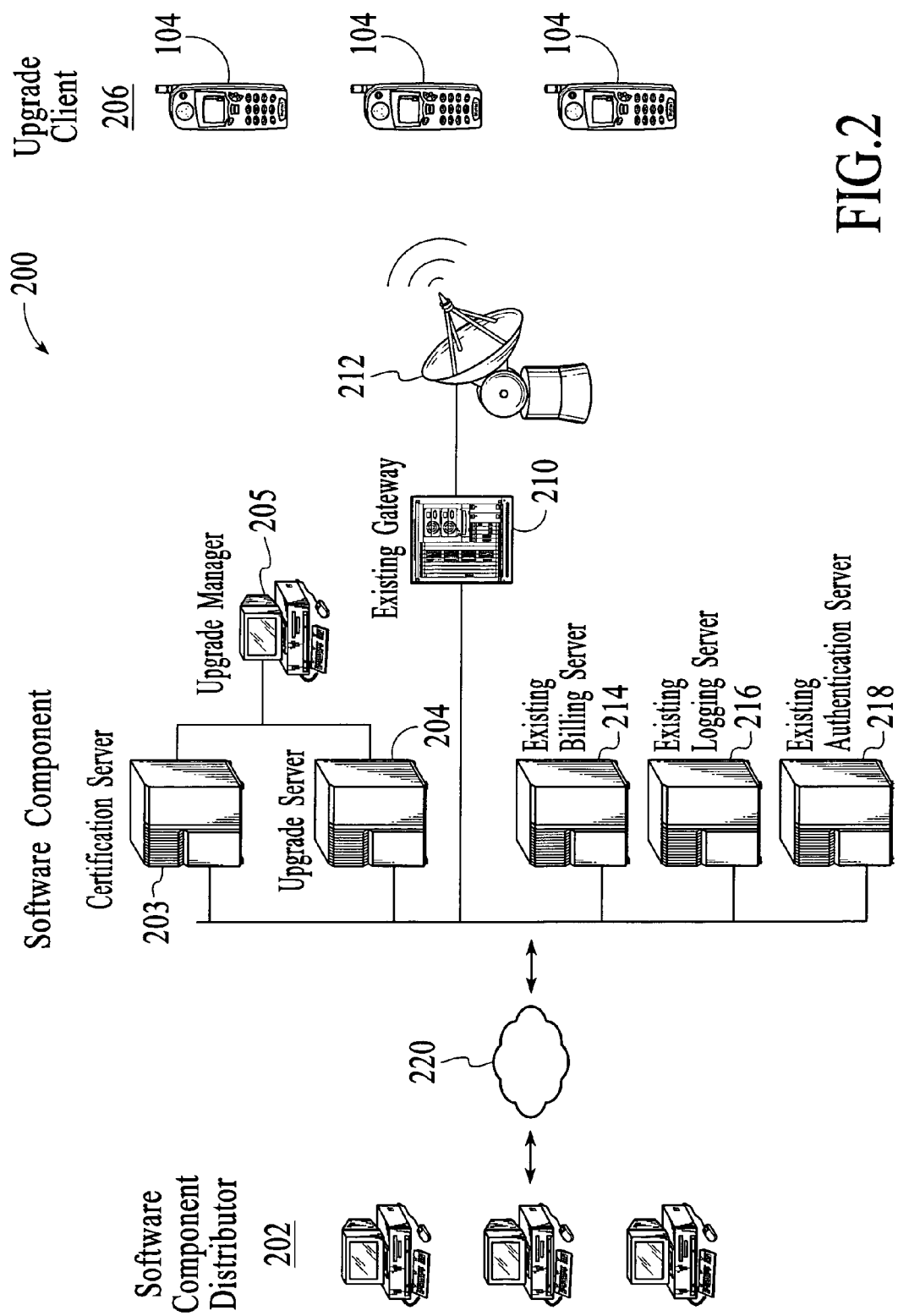
FIG. 2 is a block diagram of a software upgrade system of an embodiment.

FIG. 2 is a block diagram of a software upgrade system 200, referred to herein as the upgrade system, of an embodiment. The upgrade system uses the delta file and file updating algorithm described above in supporting software maintenance and application management for client devices including mobile electronic devices, mobile communication devices, cellular telephones, personal digital assistants, computers, and other processor-based devices. This support is provided for all device software ranging from firmware to embedded applications by enabling carriers, service providers, and device manufacturers to efficiently distribute electronic file content and applications via a wireless infrastructure.

The upgrade system 200 of an embodiment supports numerous types of software file or component updates via a delta file. The file types for which updates are supported include executable files, byte stream files, and data files, but are not so limited. The executable files, or image files, include software files used in the client device to execute tasks, for example the operating system (OS) and hardware device driver files. The byte stream files include files used by other executable files, for example, icon files, logo files, and MP3 files. Data files include files containing personal use data, and handset reference data, for example the calibration configuration files, the Protocol Independent Multicast (PIM) files, and system configuration files.

The upgrade system prevents device recalls by supporting the provision of new and revised software files to mobile client devices via various mechanisms of the service provider's wireless infrastructure. These systems function by receiving new and revised software from a software distributor and generating a delta file from the new software using the file differencing algorithm. The delta file is transferred to the client device via the infrastructure of a carrier or service provider. The upgrade client, including the file updating algorithm, of the receiving or client device uses the delta file to update the targeted software hosted on the client device.

With reference to FIG. 2, the upgrade system 200 maintains embedded software components on client devices 104 via a wireless connection with the device 212, thereby enabling wireless carriers to continuously provide the latest data services to all users. The upgrade system 200 includes, but is not limited to, a Software Component Distributor (SCD) 202, service provider upgrade components 203–205, and an upgrade client 206 hosted on the client device 104. The service provider upgrade components 203–205 include an upgrade server 204 coupled among a software component certification server 203 and an upgrade manager 205.

The SCD 202 of an embodiment provides a web-based user interface by which software providers package and release new embedded device software components such as, but not limited to, an improved MP3 driver, an upgraded Java™ 2 Platform, Micro Edition (J2ME™) Mobile Information Device Profile (MIDP) library, or a feature-added address book application. Functions of the SCD 202, as described in detail below, include registering device information and submitting device information to the software component certification server. Also, the SCD 202 receives new and original EBSCs and calculates byte-level file differences therefrom using the file differencing algorithm, registers and packages embedded software, and submits embedded software packages to the software component certification server 203. The new or revised software, following release, is provided to the service provider upgrade components 203–205 via a wired, wireless, or hybrid wired/wireless network coupling or connection 220, but is not so limited.

The SCD 202 of an embodiment is hosted on processing systems of the client device manufacturers. In an alternative embodiment, the SCD 202 is hosted on processing systems of an application or system software provider. In another alternative embodiment, the SCD 202 is hosted on processing systems of the communication service carrier or provider, for example the upgrade components 203–205.

The service provider upgrade components 203–205 are coupled among the software component distributor 202, the client devices 104, and the existing components of the service provider's infrastructure 210–218, including the existing gateway 210 and communication infrastructure 212, billing server 214, logging server 216, and authentication server 218. In this embodiment the service provider upgrade components are described in the context of a cellular telephone network or infrastructure, but alternative embodiments are not so limited.

The software component certification server 203 provides an interface to the manufacturers of client devices and, thus, receives new device information on embedded software packages from device manufacturers. The software component certification server 203 also receives software component submission requests from the software component distributor, provides notification of approval/decline of new software packages to submitting upgrade servers, provides disk management for submitted and approved software packages, and repackages and distributes approved software packages to upgrade servers. Furthermore, the software component certification server 203 provides carrier-grade security control over potential intrusion and data tampering during the software component submission process.

The upgrade manager 205, functioning as an interface among the software component certification server 203 and the upgrade server 204, provides a web-based user interface by which wireless carrier system administrators verify and approve an embedded device software component upgrade. Also, the upgrade manager 205 configures software and data packaging for optimal device management, schedules remote change notifications, and controls the update policy monitor system. Moreover, the upgrade manager 205 provides integration with the systems of the existing infrastructure, or back end systems (billing, user database authentication, web portal), thereby providing the workflow to determine authentication, access controls, and their integration into the existing billing 214 and logging 216 servers.

The upgrade server 204 provides capabilities including authenticating, connecting, and communicating with mobile devices to perform embedded software component upgrades. Communication with client devices 104 can occur via wireless connections, wired connections, hybrid wired/wireless connections, and other network connections with the client device, as appropriate to the corresponding service provider. In addition, the upgrade server 204 supports existing billing, data collection, and logging services of the service provider.

The upgrade client 206 is embedded in the client devices 104, but is not so limited. The upgrade client 206 stores and maintains configuration data of the host device 104, and provides for the maintenance and upgrading of embedded device software components using the file updating algorithm 118. Upon execution, the upgrade client 206 automatically detects the remote change of any embedded software components, notifies users of an embedded software component upgrade, and upgrades a software component based on the carriers and/or users control, as appropriate for a particular service provider. The upgrade client 206 also includes an automatic failure recovery mechanism.

Use of the delta file 116, as described above, leads to significant reductions in bandwidth required for transmission of the delta file 116 to the client device; the smaller file means less bandwidth is required for the transfer. Also, smaller files require less transmission and processing time and, therefore, decrease the probability that the file transfer will be interrupted while simultaneously reducing transmission errors in the received file.

Further to use of the delta file 116, preprocessing of the original and new files to extract particular module information from the EBSCs of these files prior to providing the files to the file differencing algorithm 114 further reduces the size of the delta file and the time for generating the delta file. Therefore, as described below, further reductions are made in the overall time associated with processing of the new files.

Figure 3:
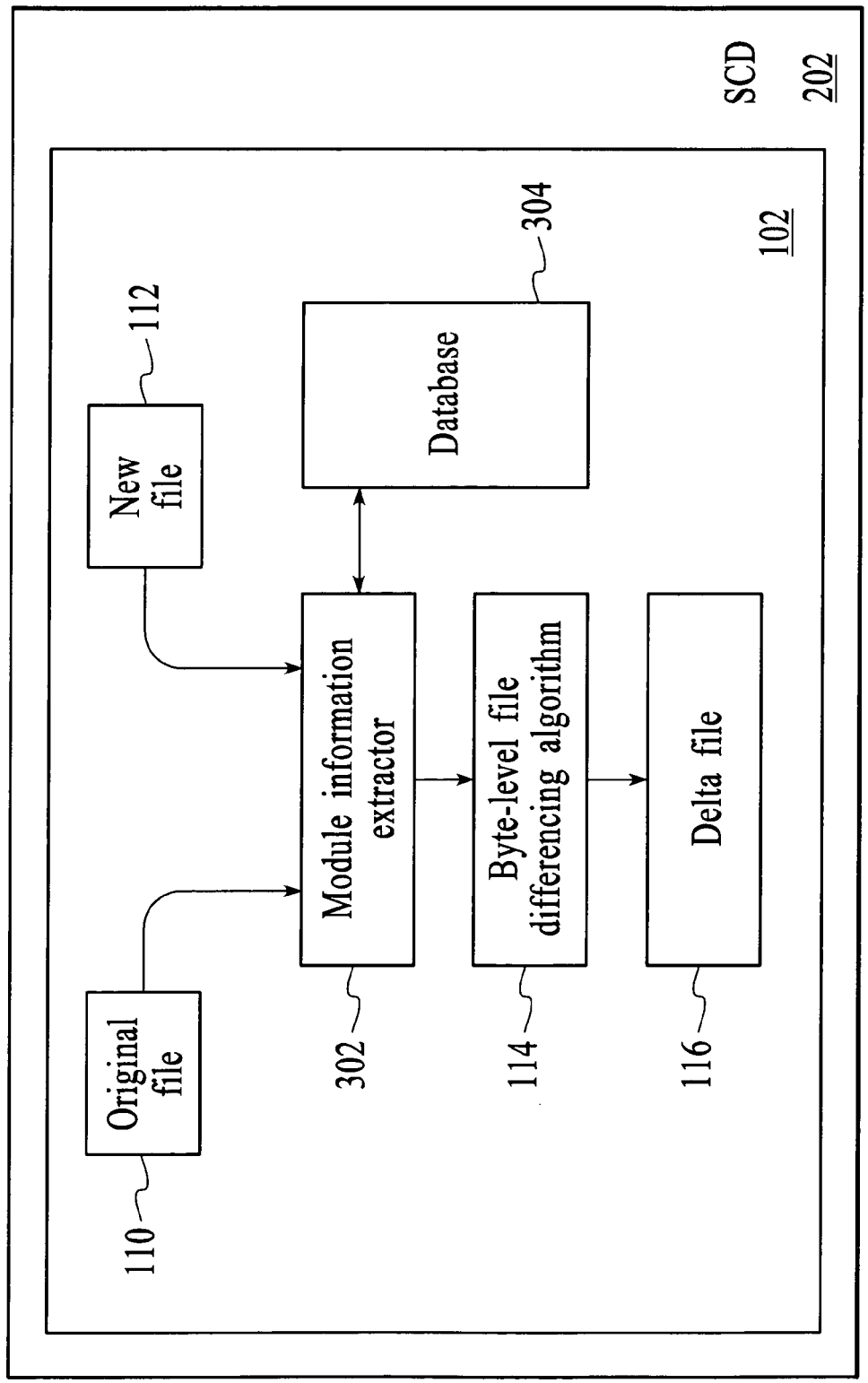
FIG. 3 is a block diagram of a software component distributor processing system of a software upgrade system, under an embodiment.

FIG. 3 is a block diagram of a processing system 102 of an SCD that includes at least one module information extractor 302, under an embodiment. The module information extractor 302 is coupled among a database 304 and the byte-level file differencing algorithm 114, and receives the original 110 and new 112 files. The file differencing algorithm 114 provides the delta file 116 as an output.

In operation, the processing system 102 receives signals representative of the original file 110 and the new file 112 and transfers the signals to the module information extractor 302. Components of the module information extractor 302 read module information associated with the EBSCs of the received files 110 and 112. The module information extractor 302 uses the module information to quickly identify differences in the received files 110 and 112 that do not require processing by the file differencing algorithm 114 in order to identify.

As one example, the module information extractor 302 identifies inserted modules of the new file 112 absent from the original file 110. The inserted modules can be easily identified using algorithms of the module information extractor 302 without using the processing resources of the file differencing algorithm 114. Information representative of the inserted modules is written (coded) to the delta file 116 or other difference file or, alternatively, written to a file in the database 304.

In addition, the module information extractor 302 identifies deleted modules of the original file 110 not found in the new file 112. The deleted modules are also easily identified using algorithms of the module information extractor 302 without using the processing resources of the file differencing algorithm 114. Information representative of the deleted modules is written (coded) to the delta file 116 or other difference file or, alternatively, written to a file in the database 304.

The module information extractor 302 also identifies modules of the new file 112 for which the start address has changed but in which the contents remain the same as in the original file 110. As with inserted and deleted modules, information representative of these modules is written (coded) to the delta file 116 or other difference file or, alternatively, written to a file in the database 304 without processing by the file differencing algorithm 114.

When the module information extractor 302 identifies modules between which there is a change in content, the corresponding modules of the original 110 and new 112 files are provided as inputs to the file differencing algorithm 114. The file differencing algorithm 114 receives the identified modules of the new file 112, compares them to the corresponding modules of the original file 110, and calculates the differences between the compared files. The file differencing algorithm 114 of an embodiment is a byte-level file differencing algorithm, as described in the Related Applications, but is not so limited. The file differencing algorithm 114 codes the identified differences to the delta file 116. A further description of the module information extractor follows.

Figure 4:
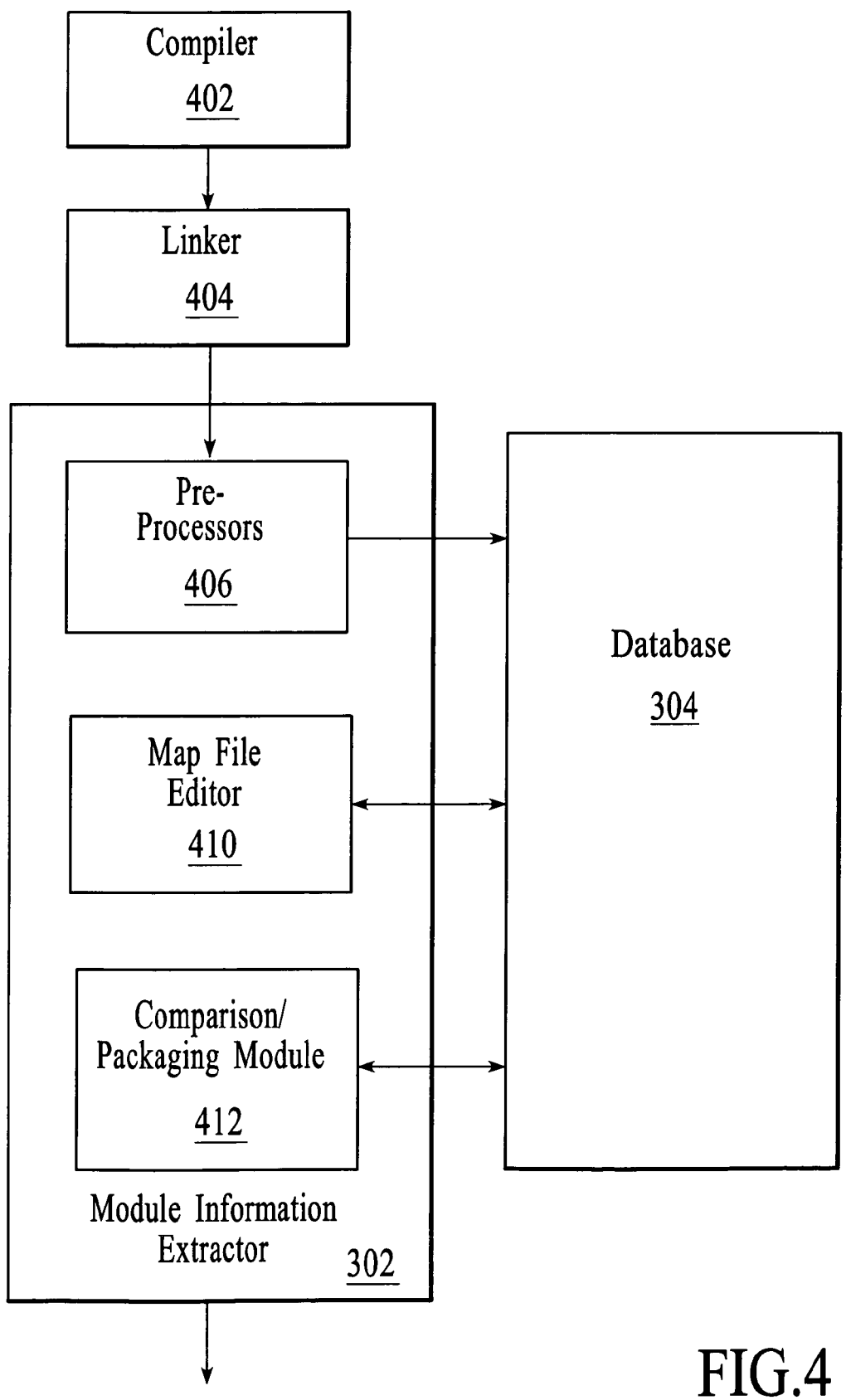
FIG. 4 is a block diagram of a module information extractor, under an embodiment.

FIG. 4 is a block diagram of a module information extractor 302, under an embodiment. The module information extractor 302 includes at least one preprocessor 406, a map file editor 410, and a comparison/packaging module 412. The preprocessor 406 can include any number and/or combination of processors. The preprocessor 406 is coupled to receive signals from at least one compiler 402 and at least one linker 404 of the SCD 202. Outputs of the preprocessor 406 are written to and stored in a database 304 of the SCD 202, but are not so limited. The database 304 is coupled for information exchange among the preprocessors 406, map file editor 410, and comparison/packaging module 412, as described below. While one each of the compiler 402, linker 404, preprocessor 406, map file editor 410, comparison/packaging module 412, and database 304 are shown, one skilled in the art appreciates that alternative embodiments may include any number of these components or equivalents thereof, including equivalent algorithms, coupled in any of a variety of combinations and configurations.

Figure 5:
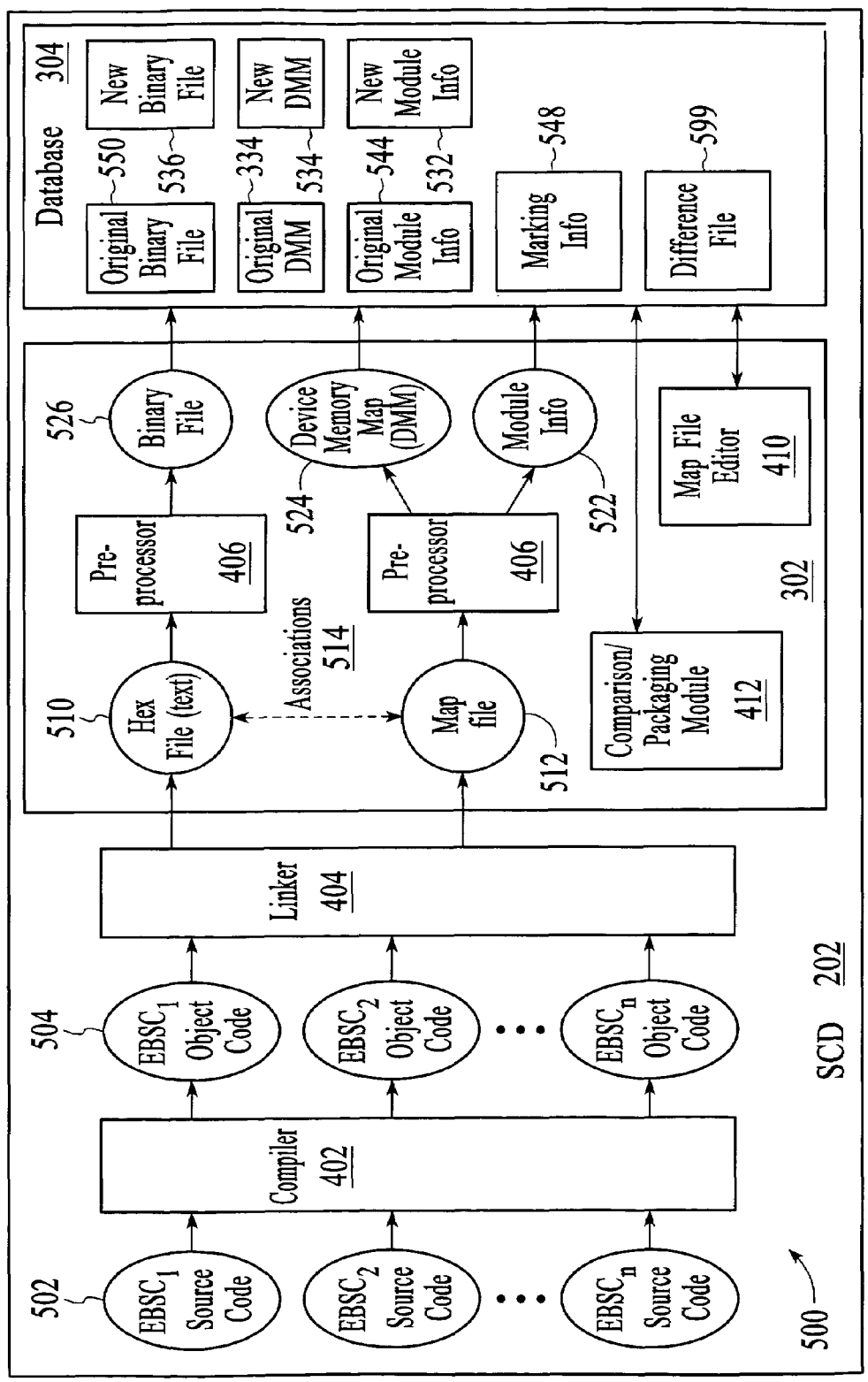
FIG. 5 shows the process of generating differences between EBSCs using module information extracted from the corresponding map files and hex files, in the context of an SCD and module information extractor of an embodiment.
Figure 6A:
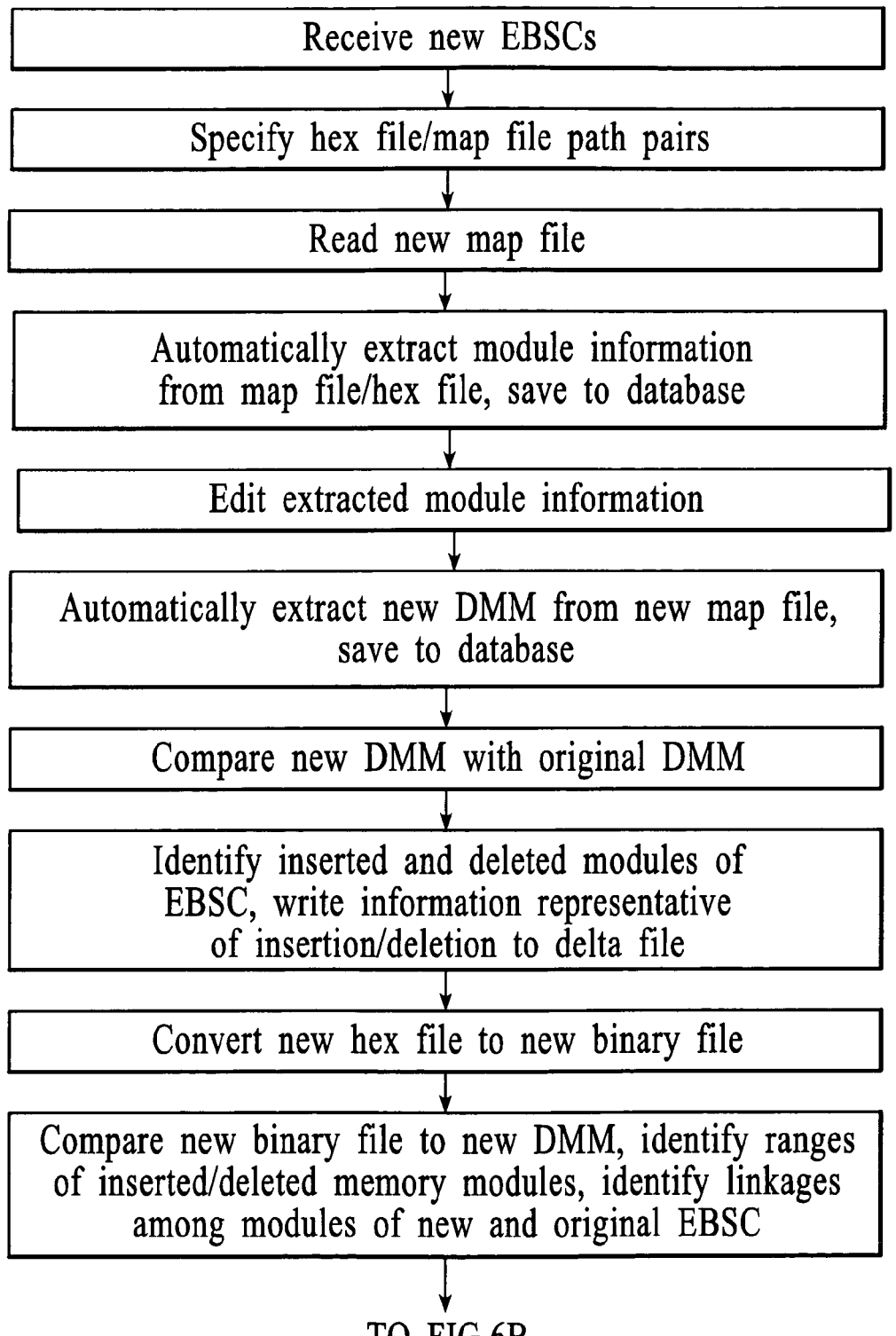
FIGS. 6A and 6B show a flow diagram for generating differences between EBSCs using module information extracted from the corresponding map files and hex files, under the embodiment of FIG. 5.
Figure 6B:
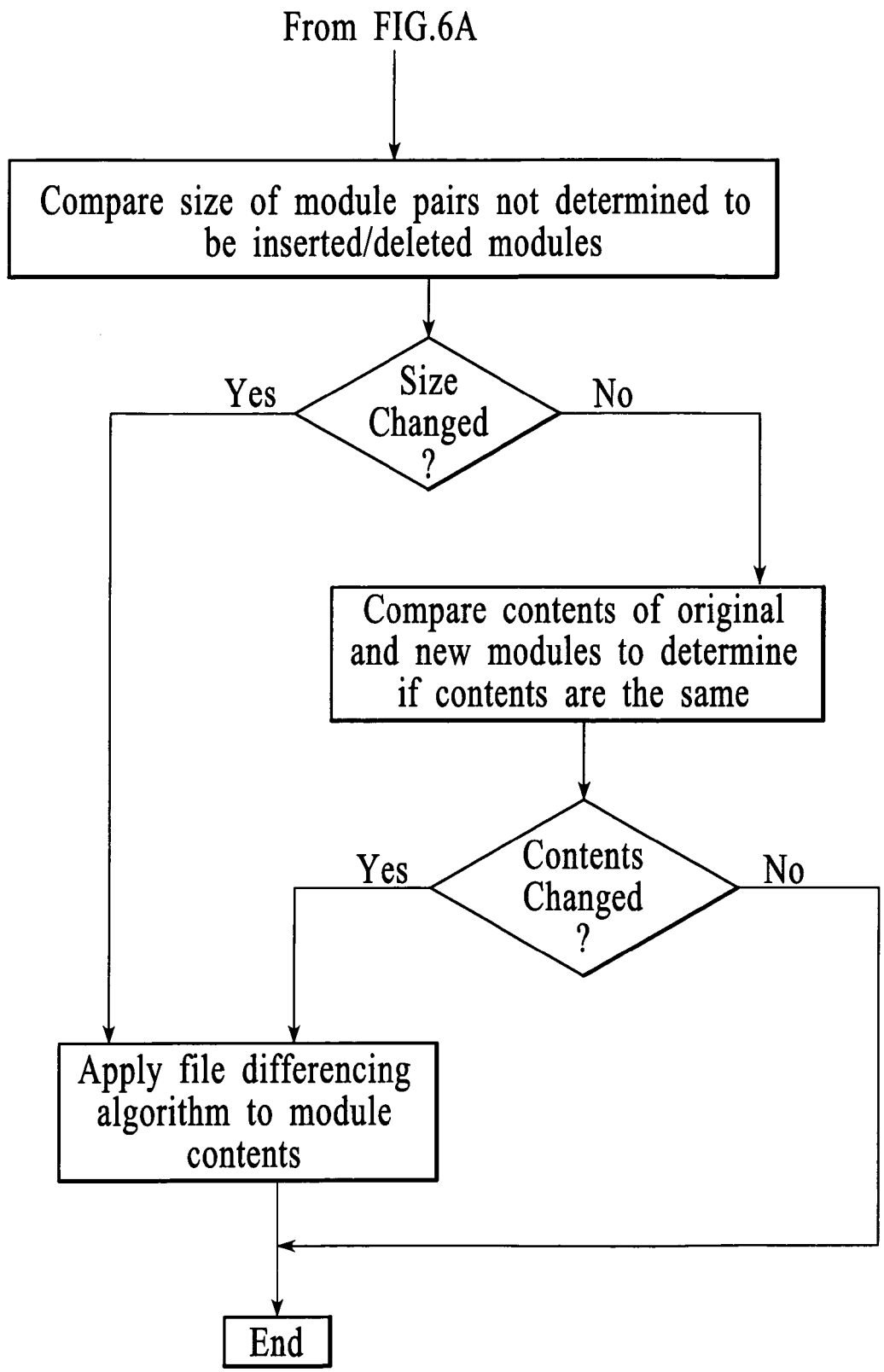

FIG. 5 shows the process 500 of generating differences between original and new EBSCs using module information extracted from the corresponding map files and hex files, in the context of an SCD 202 and module information extractor 302 of an embodiment. FIGS. 6A and 6B show a flow diagram for generating differences between EBSCs using module information extracted from the corresponding map files and hex files, under an embodiment. As described below, the DMMs, the differences among the original and the new EBSCs, and the dependency among the original and new EBSCs are all extracted automatically from the map files and corresponding hex files during this process 500.

With reference to FIG. 5, components of the SCD 202 receive source code 502 of the new EBSCs, referred to herein as the new EBSC source code 502. The SCD 202 registers the new EBSCs upon their receipt. The registration identifies the client devices that are to receive the new EBSCs.

The SCD 202 compiles the new EBSC source code 502 using compiler 402. The compiler 402 couples the resulting EBSC object code 504 to the linker 404. The linker 404, as part of the registration of the new EBSC, generates a new hex file (text) 510 and a new map file 512 from the new EBSC object code 504, where the new hex file 510 and new map file 512 correspond to the new EBSC. Further, the linker 404 specifies or generates a list of hex file/map file path pair associations 514.

A preprocessor 406 of the module information extractor 302 automatically extracts the new map file 512 corresponding to the new embedded software. As the host device embedded software includes numerous EBSCs, as described above, and each EBSC includes software modules, the preprocessor 406 uses information of the new map file 512 to automatically locate and extract module information 522 from each module of the new EBSCs. The extracted module information 522 of an embodiment includes the module name, start address, module size, and reserved memory area size for each module, but is not so limited. The SCD 202 stores the extracted module information 522 in a new module information file 532 of the database 304, but the embodiment is not so limited. Extracted module information of the original module is also stored in the database 304 in an original module information file 544.

A map file data editor 410 provides the system administrator with the capability to edit or modify the extracted module information 522. In an embodiment, the extracted module information 522 is accessed from the new module information file 532 of the database 304 for editing. In various alternative embodiments, the extracted module information 522 may be accessed for editing prior to storage in the database 304 and/or coupled directly to the map file editor 410.

Upon activation, the map file data editor 410 allows the system administrator to perform a variety of modifications to the module information of the new module information file 532. One modification permitted to the module information under an embodiment allows for selection of a range of continuous lines of the module, and designation of the selected range of lines as a grouped software component. A line of an embodiment corresponds to a module extracted from the map file with the name, start address, and size being displayed. A further modification to the module information includes designating a grouped software component according to a corresponding update status, for example, designating the grouped software components as either updateable or non-updateable software components. Yet another modification to the module information includes designating a grouped software component according to a corresponding functional status, for example, designating the grouped software components as either critical or non-critical software components.

In addition to extracting the module information 522, the preprocessor 406 also automatically extracts the new device memory map (DMM) 524 from the new map file 512. The new DMM 524 is stored in a new DMM file 534 of the database 304. The DMM of the original embedded software is stored in an original DMM file 334 of the database 304.

The preprocessor 406 of an alternative embodiment compares the new DMM 524 with the original DMM and marks the new DMM 524 to indicate code differences from the original DMM. The preprocessor 406 stores the marking information that is representative of the changes in a marking information file 548 of the database 304. The marking information can be used to determine whether the new DMM 524 is to be downloaded into the host device along with the new version of the embedded software when, for example, the host device uses static memory addressing.

As the system administrator begins the process of determining the differences between the new EBSCs and the original EBSCs in order to generate a difference file or a delta file, a comparison/packaging module 412 reads the original DMM file 334 and the new DMM file 534 from the database 304. The comparison/packaging module 412 compares the new DMM file 534 and the original DMM file 334 using the extracted module information 522. The differences in the module information 522 support the quick identification of differences among the original and new modules of the corresponding EBSC, including deleted software modules and inserted software modules. Deleted software modules include those modules of the original DMM not present in the new DMM. Inserted software modules include those modules not present in the original DMM but included in the new DMM.

Information representative of the inserted and deleted modules is written to a difference file 599 of the database 304, but the embodiment is not so limited. Alternative embodiments provide for writing the difference file 599 to other storage areas of the SCD 202. Further alternative embodiments provide for coding the information representative of the inserted/deleted modules according to the delta file format, described in detail in the Related Application, and storing the information in a corresponding delta file or difference file.

The preprocessor 406 also converts the new hex file 510 into a corresponding new binary image file 526, referred to herein as a new binary file 526. The new binary file 526 is stored in an area 536 of the database 304, but is not so limited. Alternative embodiments can store the new binary file 526 in other storage areas of the SCD 202. The original binary file corresponding to the original EBSC is also stored in an area 550 of the database 304.

The comparison/packaging module 412 reads the new binary file 526 and the new DMM 524 and performs a comparison in order to effectively identify the ranges of the deleted and/or inserted memory modules that have been deleted from or added to the new EBSC. In addition, the comparison identifies the correct linkages among modules of both the new and original EBSCs.

After identifying the deleted and inserted modules, the comparison/packaging module 412 compares the size of the remaining modules of the original and new EBSC not identified as deleted or inserted modules. A module of the new embedded software that is of a different size than the corresponding module of the original embedded software is identified as a modified module. The comparison/packaging module 412 provides the modified modules to the file differencing algorithm, described above and in the Related Applications, and the file differencing algorithm generates the corresponding delta files, but the embodiment is not so limited. The comparison/packaging module 412 of an alternative embodiment applies alternative differencing algorithms or programs to the modified modules. Alternative embodiments provide for writing information representative of the differences in the modified modules to the difference file 599 or to other storage areas of the SCD 202, instead of to a delta file.

When the module size comparison indicates that a new module is of the same size as the corresponding old module, the contents of the modules are compared to determine if they are the same. If the contents are the same, then the modules are deemed to be the same, and information representative of the equivalent modules is written to the difference file 599.

When the comparison of contents shows the contents to be different, the comparison/packaging module 412 provides the new and original modules to the file differencing algorithm for generation of the corresponding delta files, but the embodiment is not so limited. The comparison/packaging module 412 of an alternative embodiment applies alternative differencing algorithms or programs to the new modules. Alternative embodiments provide for writing information representative of the differences in the modified modules to the difference file 599 or to other storage areas of the SCD 202, instead of to a delta file.

When the SCD 202 uses a difference or delta file 599, the SCD 202 of an embodiment generates the difference file 599 by combining the difference information derived from the extracted module information and storing the information in a difference file 599. The difference information includes, but is not limited to, information as to deleted software components (change operator, and start address and size of deleted data), inserted software components (change operator, and start address and size of added data), and modified software components (a set of change operators and related, respective change descriptions, and whether the software component is critical or non-critical). The difference file 599 also includes information of the related device model name and, optionally, the new DMM associated with the new embedded software, where appropriate. Upon completion, the SCD 202 encrypts and signs the difference file, but the embodiment is not so limited.

Following generation, delta files of an embodiment are stored for future downloading to other computer systems for use in updating copies of original EBSCs hosted on the other computer systems. Referring to FIG. 1, once the delta file 116 is received via some transmission media 106 at the receiving computer system 104, the file updating algorithm 118 is used to generate a copy of the new file 112 on the receiving computer system 104, as described in the Related Application. Examples of receiving computer systems 104 include client devices that host corresponding software applications in need of updating, for example cellular telephones, mobile electronic devices, mobile communication devices, personal digital assistants, and other processor-based devices. This support is provided for all mobile device software ranging from firmware to embedded applications by enabling carriers and device manufacturers to efficiently distribute electronic file content and applications via their wireless infrastructure.

Aspects of the invention may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the invention include: microcontrollers with memory (such as electronically erasable programmable read only memory (EEPROM)), embedded microprocessors, firmware, software, etc. Furthermore, aspects of the invention may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," and words of similar import, when used in this application, shall refer to this application as a whole and not to any particular portions of this application.

The above description of illustrated embodiments of the invention is not intended to be exhaustive or to limit the invention to the precise form disclosed. While specific embodiments of, and examples for, the invention are described herein for illustrative purposes, various equivalent modifications are possible within the scope of the invention, as those skilled in the relevant art will recognize. The teachings of the invention provided herein can be applied to other processing systems and communication systems, not only for the file updating described above.

The elements and acts of the various embodiments described above can be combined to provide further embodiments. These and other changes can be made to the invention in light of the above detailed description.

All of the above references and United States patents and patent applications are incorporated herein by reference. Aspects of the invention can be modified, if necessary, to employ the systems, functions and concepts of the various patents and applications described above to provide yet further embodiments of the invention.

In general, in the following claims, the terms used should not be construed to limit the invention to the specific embodiments disclosed in the specification and the claims, but should be construed to include all processing systems that operate under the claims to provide a method for file differencing and updating. Accordingly, the invention is not limited by the disclosure, but instead the scope of the invention is to be determined entirely by the claims.

While certain aspects of the invention are presented below in certain claim forms, the inventors contemplate the various aspects of the invention in any number of claim forms. For example, while only one aspect of the invention is recited as embodied in a computer-readable medium, other aspects may likewise be embodied in a computer-readable medium. Accordingly, the inventors reserve the right to add additional claims after filing the application to pursue such additional claim forms for other aspects of the invention.

What is claimed is:

1. A system for updating electronic files comprising at least one processor-based device hosting a module information extractor, the module information extractor:
   receiving byte streams including an original byte stream and a new byte stream, wherein each of the original and new byte streams include at least one module;
   generating a new map file, new hex file, new binary file, and new device memory map (DMM) associated with the new byte stream;
   reading module information of the modules of the new byte stream using information of the new map file and the new hex file;
   comparing the new DMM with an original DMM using the module information, wherein the original DMM corresponds to the original byte stream;
   identifying inserted and deleted modules of the new byte stream in response to the DMM comparison, the inserted modules being present in the new byte stream and absent from the original byte stream and the deleted modules being absent from the new byte stream and present in the original byte stream;
   identifying remaining modules in which the contents remain the same as corresponding modules of the original byte stream, wherein the remaining modules are any modules of the new byte stream not identified as inserted modules; and
   generating difference information representative of the inserted modules, deleted modules, and remaining modules in which the contents remain the same.

2. The system of claim 1, wherein identifying remaining modules in which the contents remain the same further comprises:
   comparing sizes of remaining modules of the new byte stream with corresponding modules of the original byte stream; and
   selecting remaining modules on which to apply file differencing in response to information of the size comparison.

3. The system of claim 2, wherein selecting remaining modules on which to apply file differencing further comprises applying file differencing to module contents of the remaining modules of the new byte stream for which the size comparison indicates a difference in size.

4. The system of claim 2, wherein selecting remaining modules on which to apply file differencing further comprises:

comparing module contents of the remaining modules of the new byte stream with module contents of the corresponding modules when the size comparison indicates corresponding modules of the new and original byte streams are of the same size; and applying file differencing on modules of the new byte stream for which the content comparison indicates a difference in content from the corresponding modules of the original byte stream.

5. The system of claim 2, further comprising a file differencing algorithm coupled to receive and apply byte-level file differencing to the selected remaining modules.

6. The system of claim 1, wherein identifying inserted and deleted modules of the new byte stream further comprises identifying address ranges of the identified inserted and deleted modules by comparing the new binary file with the new DMM.

7. The system of claim 1, further comprising a database coupled to receive the new map file, the new hex file, the new binary file, the new DMM, and the difference information from the module information extractor.

8. The system of claim 7, wherein the difference information is stored in a difference file.

9. The system of claim 1, wherein the module information includes at least one of a module name, module start address, module size, and reserved memory area size.

10. The system of claim 1, further comprising a map file editor for editing the module information.

11. The system of claim 1, wherein the original and new byte streams comprise software files including dynamic link library files, shared object files, embedded software components (EBSCs), firmware files, executable files, data files including hex data files, system configuration files, and files including personal use data.

12. The system of claim 1, wherein the at least one processor-based device is at least one of personal computers, portable computing devices, cellular telephones, portable communication devices, and personal digital assistants.

13. A computer readable medium including executable instructions which, when executed in a processing system, performs differencing between electronic files, comprising:

receiving byte streams including an original byte stream and a new byte stream, wherein each of the original and new byte streams include at least one module;

generating a new map file, new hex file, new binary file, and new device memory map (DMM) associated with the new byte stream;

reading module information of the modules of the new byte stream using information of the new map file and the new hex file;

comparing the new DMM with an original DMM using the module information, wherein the original DMM corresponds to the original byte stream;

identifying inserted and deleted modules of the new byte stream in response to the DMM comparison, the inserted modules being present in the new byte stream and absent from the original byte stream and the deleted modules being absent from the new byte stream and present in the original byte stream;

identifying remaining modules in which the contents remain the same as corresponding modules of the original byte stream, wherein the remaining modules are any modules of the new byte stream not identified as inserted modules; and generating difference information representative of the inserted modules, deleted modules, and remaining modules in which the contents remain the same.

* * * * *